United States Patent [19]

Howard

[11] Patent Number: 4,712,853
[45] Date of Patent: Dec. 15, 1987

[54] RAPIDLY STARTING LOW POWER SCAN MECHANISM

[75] Inventor: P. Guy Howard, Junction City, Oreg.

[73] Assignee: Spectra-Physics, Inc., San Jose, Calif.

[21] Appl. No.: 834,190

[22] Filed: Feb. 27, 1986

[51] Int. Cl.$^4$ .............................. G02B 26/10
[52] U.S. Cl. ....................... 350/6.5; 350/6.7; 318/341
[58] Field of Search .................. 350/6.5, 6.7, 6.8; 318/331, 314, 341

[56] References Cited

U.S. PATENT DOCUMENTS

| | | | |
|---|---|---|---|
| 4,140,903 | 2/1979 | Clark | 350/6.7 |
| 4,145,642 | 3/1979 | Kosada et al. | 318/331 |
| 4,307,324 | 12/1981 | Regrier | 318/314 |
| 4,498,034 | 2/1985 | Shirakawa | 318/341 |
| 4,578,625 | 3/1986 | Nazarian et al. | 318/341 |
| 4,605,884 | 8/1986 | Miyagi | 318/314 |

Primary Examiner—John K. Corbin
Assistant Examiner—Loha Ben
Attorney, Agent, or Firm—Donald C. Feix; Paul Davis; T. M. Freiburger

[57] ABSTRACT

A beam scanner system particularly for use with laser scanners employs the back EMF signal from a scanner driving motor for a tachometer signal indicating motor speed. The tachometer signal goes into a phase lock loop for causing the motor at startup to quickly obtain operating speed, and for controlling speed while the motor is in operation. Using the phase lock loop, a clock signal is compared to the tachometer signal from the motor, and power to the motor is increased or decreased whenever and so long as the tachometer signal is not equal to the desired speed. The system therefore provides a very quickly starting scanner, as for use in hand held bar code scanners, without requiring the scanner to be kept energized on standby power when the laser is not active.

5 Claims, 1 Drawing Figure

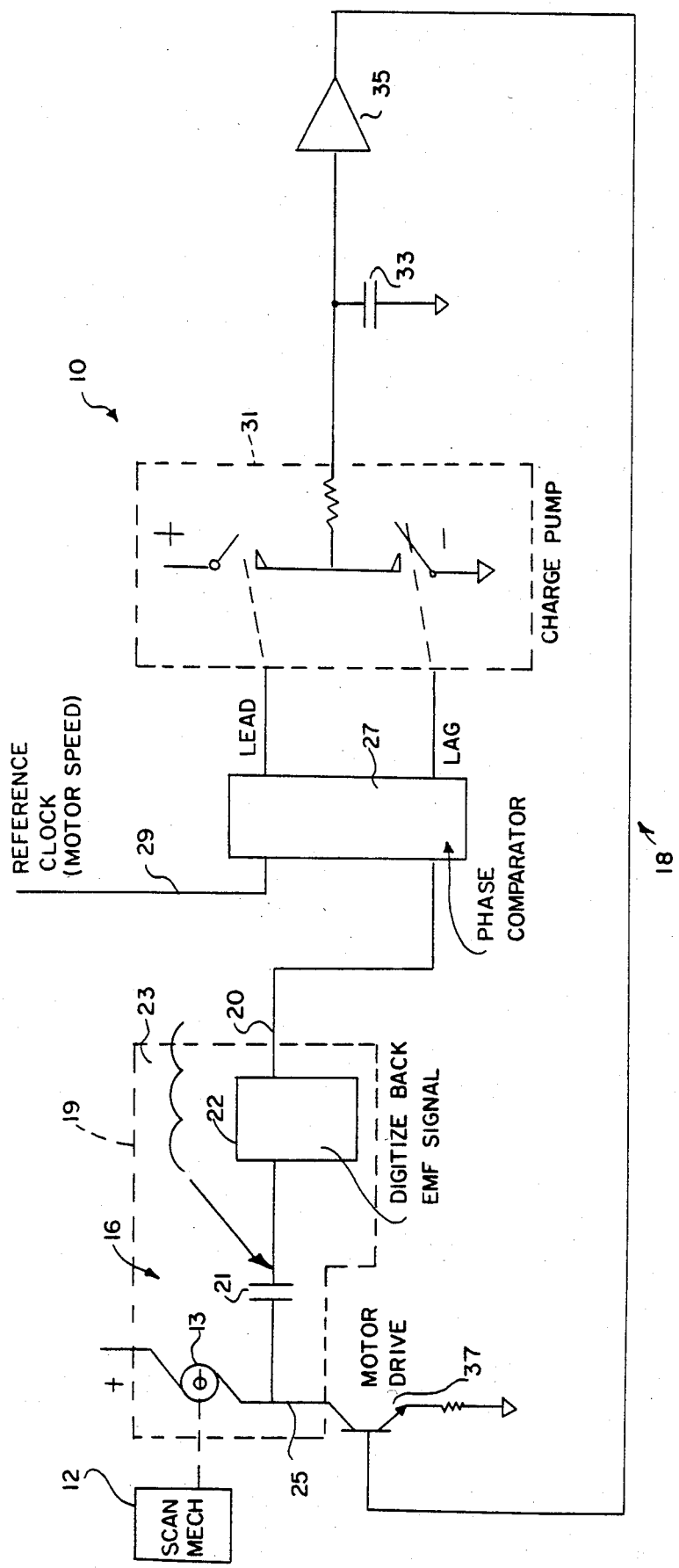

RAPIDLY STARTING LOW POWER SCAN MECHANISM

BACKGROUND OF THE INVENTION

The invention relates to optical beam scanning apparatus, and to more particularly to a beam scanner capable of quickly obtaining operating speed so as to avoid the need for keeping the scanner energized on standby power, in an apparatus efficient in construction.

Optical beam scanners have conventionally used various types of scanning devices. Many "dither" scanners have employed an oscillating spring-loaded member for oscillating the position of a scanner mirror. This system required low power, which was necessary because when used in hand-held laser bar code scanners, the ditherer device was kept oscillating on standby power when the laser was inactive and standing by for use. The reason for keeping such scanning apparatus active during intermittent periods of nonuse was the relatively long startup time required to attain full normal oscillating speed after the apparatus was first energized.

Some of the prior systems employed a stepper motor for oscillating a mirror. The motor would step from one stable state to another stable state to effect a sinusoidal mirror oscillation by mass loading. Although such systems were capable of rapid startup, the stepper motor consumed a great deal of power, approximately in the range of 40 to 70 milliamps.

It is an object of the present invention to eliminate the need for continued energization of an optical beam scanner motor on a standby basis, by powering a scanner mechanism with a motor and drawing low power and including a control system that brings the scanner very quickly up to operating speed when power is first applied, by the application of a controlled burst of power to accelerate the motor.

SUMMARY OF THE INVENTION

In accordance with the present invention, an optical beam scanner mechanism is powered by a DC brush type motor, which inherently generates a back EMF signal representative of the speed of the motor. The back EMF signal is sensed, digitized and put into a phase lock loop, which includes control of the motor by supplying additional power to the motor during startup to the extent needed to quickly accelerate the motor to the desired operating speed. The back EMF signal is digitized and fed to a phase comparator whose other input is a clock representing desired motor speed. In the phase comparator an error signal is generated which represents the difference between the motor speed and its desired speed. When the motor is below desired speed, an error signal proportional to the speed difference is generated, and this error signal is used to supply appropriate additional power to the motor to more rapidly accelerate it, until a desired speed is attained. Similarly, if the motor is too fast, the control loop will slow it to achieve the correct speed.

In this way any scan generator having a rotating element can be made to start very rapidly, with a low power requirement and with the scanner shut off in standby periods. The scanner of the invention, which also employs relatively inexpensive components, is particularly useful in battery powered hand held bar code readers. It is reliable and able to withstand considerable vibration or impact without damage.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE DRAWING

FIG. 1 is a schematic circuit diagram indicating an optical scanning device in accordance with the principles of the invention, with scanning apparatus driven by a DC brush type motor, and including a phase lock loop for controlling the amount of power supplied to the motor during startup.

DESCRIPTION OF A PREFERRED EMBODIMENT

In the drawing, FIG. 1 shows schematically, in circuit diagram form, a system 10 for scanning an optical beam, such as that of a laser bar code reader, and for quickly bringing the scanner up to the operating scanning speed so that standby power is not required to keep the scanner active during periods when the optical beam is not in use and is not energized.

The system 10 includes mechanical scanning apparatus indicated primarily as the block 12, including a scanning mirror (not shown) and with a rotating wheel 13 or other rotational component included in the mechanical apparatus. The source of the optical beam reflected by the mirror is not shown. An electric motor 16 drives the scanning mechanism and is indicated as mechanically coupled to it. A phase lock loop generally indicated at 18 controls the startup acceleration and operating speed of the motor 16 in accordance with the principles of the invention.

Shown within a dashed line box 19 in the drawing is a system of components which make up a tachometer yielding at a point 20 in the drawing a digital tach signal representative of motor speed. The components making the tachometer include the motor 16 with its back EMF signal, a coupling capacitor 21 and a digitizer 22, which digitizes the back EMF wave form, indicated in predigitized form by the wave form 23 in FIG. 1.

The electric motor 16 preferably is a DC brush type motor, although other types of electric motors will also yield a usable back EMF signal. The motor is connected via its commutator (not shown) and a motor lead 25 to the capacitor 21, at the beginning of the phase lock loop 18. The back EMF signal pulses are related to the number of segments in the commutator and the speed of the motor.

The digitized EMF signal goes from the point 20 into a phase comparator 27, which also receives a clock signal or reference timing signal 29 which is at a reference frequency corresponding to the desired normal operating speed of the motor. The two signals entering the phase comparator 27 are compared to determine whether the motor 16 is precisely at operating speed, and if not, the phase comparator 27 outputs a pulse signal carrying the direction of speed difference, i.e. too fast or too slow, "LEAD" or "LAG", with the pulse width of the signal indicating the timing difference.

If the motor is running too slowly, as in the initial part of start up, the phase comparator will send a pulse signal along the LAG line in FIG. 1 to a charge pump 31, which typically comprises bipolar transistor switches. If, on the other hand, the motor is overspeeding, a pulsed signal is sent out by the phase comparator along the LEAD line shown in FIG. 1, to the charge pump 31. The pulse signal in either event puts small increments of charge of the appropriate sign on a capacitor 33.

Phase comparators of various types are well known, and the phase comparator 27 is of a type suitable for the present purpose wherein LEAD or LAG must be determined from the input phase information.

The incremental charge buildup (either positive or negative) on the capacitor 33 results in a control voltage which is amplified in an amplifier 35 and fed back to a motor drive transistor 37. In this way, a surge of additional power is fed to the motor 16 during periods when the motor is below operating speed or "lagging" and a reduced amount of power is fed to the motor in instances of overspeeding.

It is clear from the circuit 10 that when the desired operating speed is reached, the pulses on the LEAD and the LAG lines from the phase comparator tend toward zero width, and when this occurs only a normal level of power is then fed to the motor 16, to maintain it at operating speed.

It should be understood that the phase comparator portion of the loop 18 could be implemented using a microprocessor which might be employed for other control functions in the scanner unit.

The system of the invention enables a rapid start in a scanner which is efficient in power consumption and can be shut off in standby periods. For a scanner mechanism associated with a hand held beam scanner, such as a bar code reader, only a few milliamps are required to drive the system at operating speed, including a very small amount of power, possibly under one milliamp, to power the phase lock loop. During startup, tens of milliamps may additionally be fed to the motor 16 to attain operating speed quickly.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. An optical beam scanning device capable of quickly obtaining operating speed and drawing relatively low power, comprising,
    optical scanning apparatus including at least one mirror for scanning a beam in a desired scanning pattern, the beam originating from a beam source associated with the scanning device,
    an electric DC brush type motor driving the optical scanning apparatus,
    means for picking up a back EMF signal from the motor,
    processor means for comparing the back EMF signal with a reference frequency timing signal to determine whether the motor's speed is equal to the desired operating speed as defined by the reference frequency timing signal and, when the motor is not at desired speed, for generating an error signal representative of the difference between the motor's actual speed and the desired speed, and
    motor speed drive means for varying power to the motor when it is not at desired speed, in accordance with the direction and size of the error signal.

2. The optical beam scanning device of claim 1, including digitizer means for digitizing the back EMF signal from the motor, and wherein the processor means includes phase comparator means for receiving the reference timing signal and the digitized back EMF signal, for comparing their phase and for outputting a LEAD or a LAG signal depending on whether the motor is overspeeding or under desired speed and carrying a pulsewidth representative of the difference in speed.

3. The optical beam scanning device of claim 2, wherein the processor means further includes charge pump and capacitor means for receiving the LEAD or LAG signal and for interpreting the signal to produce an analog voltage signal, and feedback means for feeding the analog voltage signal to the motor drive means.

4. The optical beam scanning device of claim 3, wherein the feedback means includes a high impedance buffer.

5. The optical beam scanning device of claim 1, wherein the means for picking up the back EMF signal includes a capacitor positioned between the motor and the processor means so as to block the DC component of the back EMF signal and to allow through to the processor means only an AC ripple component having a waveform with a frequency proportional to the speed of the motor.

* * * * *